United States Patent
Jeong

(10) Patent No.: US 9,094,541 B2
(45) Date of Patent: Jul. 28, 2015

(54) PRINTING CONTROL TERMINAL APPARATUS, IMAGE FORMING APPARATUS, AND METHOD OF CONTROLLING THE SAME

(71) Applicant: SAMSUNG Electronics Co., Ltd., Suwon-si, Gyeonggi-do (KR)

(72) Inventor: Yong-sik Jeong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 57 days.

(21) Appl. No.: 13/961,954

(22) Filed: Aug. 8, 2013

(65) Prior Publication Data

US 2014/0085659 A1  Mar. 27, 2014

(30) Foreign Application Priority Data

Sep. 24, 2012  (KR) ........................ 10-2012-0106067

(51) Int. Cl.
*G06K 15/00* (2006.01)
*H04N 1/00* (2006.01)
*G06F 3/12* (2006.01)
*G06F 11/34* (2006.01)

(52) U.S. Cl.
CPC .......... *H04N 1/00079* (2013.01); *G06F 3/1207* (2013.01); *G06F 3/1273* (2013.01); *G06F 3/1285* (2013.01); *G06F 11/34* (2013.01)

(58) Field of Classification Search
None
See application file for complete search history.

(56) References Cited

U.S. PATENT DOCUMENTS

| 2007/0229887 | A1 | 10/2007 | Nakagawa |
| 2008/0289031 | A1* | 11/2008 | Anno ............................... 726/17 |
| 2009/0180141 | A1 | 7/2009 | Takaishi et al. |
| 2009/0273805 | A1 | 11/2009 | Nakagawa |
| 2012/0105904 | A1* | 5/2012 | Otey et al. ..................... 358/1.15 |
| 2013/0006949 | A1* | 1/2013 | Essawi et al. ................. 707/703 |

OTHER PUBLICATIONS

Extended European Search Report dated Apr. 22, 2014 issued in EP Application No. 13184852.5.

* cited by examiner

*Primary Examiner* — Marcellus Augustin
(74) *Attorney, Agent, or Firm* — Staas & Halsey LLP

(57) ABSTRACT

A printing control terminal apparatus, an image forming apparatus, and a method of controlling the same. The printing control terminal apparatus includes a communication interface to receive job log data from the image forming apparatus, a storage device to store the received job log data, and a controller to extract job accumulation amounts and job quantities, which belong to the same job type, from the job log data in a time order, and to determine whether the job log data has been lost based on the extracted job accumulation amounts and job quantities.

25 Claims, 15 Drawing Sheets

| JOB END TIME | JOB PROCESSING RESULT | QUANTITY | ACCUMULATION AMOUNT | JOB TYPE | IMAGE FORMING APPARATUS IDENTIFICATION NUMBER | USER ID |
|---|---|---|---|---|---|---|
| 2011년 9월 7일 | SUCCESS | 5 | 5 | PRINT | 14BUB1DQA00001T | abcd |
| 2011년 9월 12일 | SUCCESS | 4 | 4 | COPY | 14BUB1DQA00001T | efgh |
| 2011년 9월 15일 | SUCCESS | 3 | 3 | SCAN | 14BUB1DQA00001T | abcd |
| 2011년 9월 21일 | SUCCESS | 5 | 10 | PRINT | 14BUB1DQA00001T | abcd |
| 2011년 9월 26일 | SUCCESS | 5 | 15 | PRINT | 14BUB1DQA00001T | efgh |

FIG. 6

| JOB END TIME | JOB TYPE | ACCUMULATION AMOUNT |
|---|---|---|
| SEP. 07, 2011 | PRINT | 5 |
| SEP. 12, 2011 | COPY | 4 |
| SEP. 15, 2011 | SCAN | 3 |
| SEP. 21, 2011 | PRINT | 10 |
| SEP. 26, 2011 | PRINT | 15 |

FIG. 7

| JOB END TIME | JOB PROCESSING RESULT | QUANTITY | JOB TYPE | IMAGE FORMING APPARATUS IDENTIFICATION NUMBER | USER ID |
|---|---|---|---|---|---|
| SEP. 07, 2011 | SUCCESS | 5 | PRINT | 14BUB1DQA00001T | abcd |
| SEP. 12, 2011 | SUCCESS | 4 | COPY | 14BUB1DQA00001T | efgh |
| SEP. 15, 2011 | SUCCESS | 3 | SCAN | 14BUB1DQA00001T | abcd |
| SEP. 21, 2011 | SUCCESS | 10 | PRINT | 14BUB1DQA00001T | abcd |
| SEP. 26, 2011 | SUCCESS | 15 | PRINT | 14BUB1DQA00001T | efgh |

FIG. 8

| JOB END TIME | JOB PROCESSING RESULT | QUANTITY | ACCUMULATION AMOUNT | JOB TYPE | IMAGE FORMING APPARATUS IDENTIFICATION NUMBER | USER ID |
|---|---|---|---|---|---|---|
| 2011년 9월 7일 | SUCCESS | 5 | 5 | PRINT | 14BUB1DQA00001T | abcd |
| 2011년 9월 12일 | SUCCESS | 4 | 4 | COPY | 14BUB1DQA00001T | efgh |
| 2011년 9월 15일 | SUCCESS | 3 | 3 | SCAN | 14BUB1DQA00001T | abcd |
| 2011년 9월 21일 | SUCCESS | 5 | 10 | PRINT | 14BUB1DQA00001T | abcd |
| 2011년 9월 26일 | SUCCESS | 5 | 15 | PRINT | 14BUB1DQA00001T | efgh |

FIG. 9

| JOB END TIME | JOB PROCESSING RESULT | QUANTITY | ACCUMULATION AMOUNT | JOB TYPE | IMAGE FORMING APPARATUS IDENTIFICATION NUMBER | USER ID |
|---|---|---|---|---|---|---|
| SEP. 07, 2011 | SUCCESS | 5 | 5 | PRINT | 14BUB1DQA00001T | abcd |
| SEP. 12, 2011 | SUCCESS | 4 | 4 | COPY | 14BUB1DQA00001T | efgh |
| SEP. 15, 2011 | SUCCESS | 3 | 3 | SCAN | 14BUB1DQA00001T | abcd |
| SEP. 26, 2011 | SUCCESS | 5 | 15 | PRINT | 14BUB1DQA00001T | efgh |

PRINTING CONTROL TERMINAL APPARATUS, IMAGE FORMING APPARATUS, AND METHOD OF CONTROLLING THE SAME

CROSS-REFERENCE TO RELATED APPLICATIONS

This application claims priority under 35 U.S.C. §119(a) to Korean Patent Application No. 10-2012-0106067, filed on Sep. 24, 2012, in the Korean Intellectual Property Office, the disclosure of which is incorporated herein by reference in its entirety.

BACKGROUND OF THE INVENTION

1. Field of the Invention

The present disclosure relates generally to a printing control terminal apparatus, an image forming apparatus, and a method of controlling the same, and more particularly, to a printing control terminal apparatus, an image forming apparatus, and a method of controlling the same, which can generate job log data capable of performing error detection.

2. Description of the Related Art

An image forming apparatus can generate/store various job result data (hereinafter referred to as "job log data"). For example, the image forming apparatus confirms and stores "who/when/where/what/how" a print job has been processed as job log data.

That is, the image forming apparatus may collect "who" instructed a job by inputting a user ID before performing the job. "When" may be stored by confirming a job end time. Further, the contents related to "where", "what", and "how" may be confirmed from document data and print data after the image forming apparatus finishes the print job.

Table 1 below represents a data table that exemplarily explains the type of data constituting such job log data.

TABLE 1

| Classification | Collected item | Job log data | Use example of data |
|---|---|---|---|
| Who | User ID | Gildong.hong | Who used an image forming apparatus |
| When | Date | Sep. 12, 2011 | When an image forming apparatus was used |
| Where | Printer serial | 14BUB1DQA00004T | Which image forming apparatus was used |
| What | Job type | Copy | What function of an image forming apparatus was used |
| How | Job amount | 4 sheets | How long an image forming apparatus was used |

With reference to Table 1 as shown above, a manager of the image forming apparatus or an after-service engineer can confirm, if needed later, that a person having a user ID "gildong.hong" copied 4 sheets on Sep. 12, 2011 using the image forming apparatus having the inherent serial number 14BUB1 DQA00004T.

Briefly, there are two general methods for storing job log data to perform such functions. One is a method for classifying the job result for each job type and accumulating only the job amounts and the other is a method for storing a job quantity for each job type.

The method for storing only the job accumulation amounts and the method for storing information on various job results including the job quantities may have different data sizes, data storages, and data management methods. Accordingly, if storing of job accumulation amount data in a time order and storing of job log data including the job quantities in a time order are not synchronized or are not matched with each other, there occurs a difference between the job accumulation amount data and the job quantity data.

The above-described methods in the related art have the problems that since two pieces of information are generated at different time points and different subjects store and manage the information, an error of the job log data is unable to be detected in the case where the synchronization is broken.

SUMMARY OF THE INVENTION

The present genera inventive concept provides a printing control terminal apparatus, an image forming apparatus, and a method of controlling the same, which can generate job log data capable of performing error detection.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a printing control terminal apparatus connectable to an image forming apparatus, the printing control terminal apparatus including a communication interface to receive job log data from the image forming apparatus, a storage device to store the received job log data, and a controller to extract one or more job accumulation amounts and one or more job quantities, which belong to a same job type, from the job log data in a time order, and to determine whether the job log data has been lost based on the extracted job accumulation amounts and job quantities.

The controller may calculate a difference value between the successive job accumulation amounts of the extracted job accumulation amounts, and may determine that the job log data has been lost if the job quantity of a job executed subsequently among the extracted job quantities is different from the difference value.

The job type may be at least one of printing, copying, scanning, and faxing or a combination thereof.

The job log data may include the job accumulation amounts and the job quantities which are aligned in the time order.

The job log data may further include an identification number of the image forming apparatus, a job end time, a job processing result, and a user ID of the image forming apparatus, and may be aligned in at least one of ascending and descending orders depending on the job end time.

The controller may request lost data from the image forming apparatus through the communication interface if the job log data has been lost.

The controller may determine whether the lost data has been received, and if the lost data has been received, the controller may store the received lost data in the storage device, while if the lost data has not been received, the controller may store information on whether the data has been lost in the storage device.

The foregoing and/or other features and utilities of the present general inventive concept may also be achieved by providing an image forming apparatus including a communication interface to receive print data, an image former to perform a print job using the received print data, a controller to generate first job log data and second job log data when the print job is completed, and to generate third job log data by correcting the second job log data using the first job log data, and a storage device to store the first job log data and the third job log data.

The third job log data may further include job accumulation amounts included in the first job log data in addition to the second job log data, and the job accumulation amounts may be aligned by job types according to a job time and be included in the second job log data.

The job type may be at least one of printing, copying, scanning, and faxing or a combination thereof.

The third job log data may include job accumulation amounts and job quantities which are aligned in at least one of ascending and descending orders according to a job time order.

The third job log data may further include a job processing result, a user ID, and a serial number of the image forming apparatus.

The foregoing and/or other features and utilities of the present general inventive concept may also be achieved by providing a method of controlling a printing control terminal apparatus connectable to an image forming apparatus, the method including receiving job log data from the image forming apparatus, storing the received job log data, extracting one or more job accumulation amounts and one or more job quantities, which belong to a same job type, from the job log data in a time order, and determining whether the job log data has been lost based on the extracted job accumulation amounts and job quantities.

The determining step may include calculating a difference value between the successive job accumulation amounts of the extracted job accumulation amounts; comparing the job quantity of a job executed subsequently among the extracted job quantities with the difference value; and determining that the job log data has been lost if the extracted job quantity is different from the difference value.

The job type may be at least one of printing, copying, scanning, and faxing or a combination thereof.

The job log data may include the job accumulation amounts and the job quantities which are aligned in the time order.

The job log data may further include an identification number of the image forming apparatus, a job end time, a job processing result, and a user ID of the image forming apparatus, and may be aligned in at least one of ascending and descending orders depending on the job end time.

The method for controlling a printing control terminal apparatus according to the aspect of the present disclosure may further include requesting lost data from the image forming apparatus if the job log data has been lost.

The method for controlling a printing control terminal apparatus according to the aspect of the present disclosure may further include determining whether the lost data has been received, and if the lost data has been received, storing the received lost data, while if the lost data has not been received, storing information on whether the data has been lost.

The foregoing and/or other features and utilities of the present general inventive concept may also be achieved by providing a method of controlling an image forming apparatus, the method including receiving print data, performing a print job using the received print data, generating first job log data and second job log data when the print job is completed, generating third job log data by correcting the second job log data using the first job log data, and storing the first job log data and the third job log data.

The third job log data may further include job accumulation amounts included in the first job log data in addition to the second job log data, and the job accumulation amounts may be aligned by job types according to a job time and be included in the second job log data.

The job type may be at least one of printing, copying, scanning, and faxing or a combination thereof.

The third job log data may include job accumulation amounts and job quantities which are aligned in at least one of ascending and descending orders according to a job time order.

The third job log data may further include a job processing result, a user ID, and a serial number of the image forming apparatus.

The foregoing and/or other features and utilities of the present general inventive concept may also be achieved by providing a computer-readable recording medium recorded with a code to execute a method described above or hereinafter.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 6 is a diagram illustrating a data table including data of the job accumulation amounts illustrated in FIG. 5 by job types in a time order;

FIG. 7 is a diagram illustrating a data table including job quantities by job types in a time order in an image forming apparatus according to an embodiment of the present disclosure;

FIG. 8 is a diagram illustrating a data table that is generated by adding the job accumulation amounts in the data table of FIG. 6 to the data table of FIG. 7;

FIG. 9 is a diagram illustrating a data table to show that a portion of data in the data table illustrated in FIG. 8 has been lost;

DETAILED DESCRIPTION OF THE PREFERRED EMBODIMENTS

Figure 1:
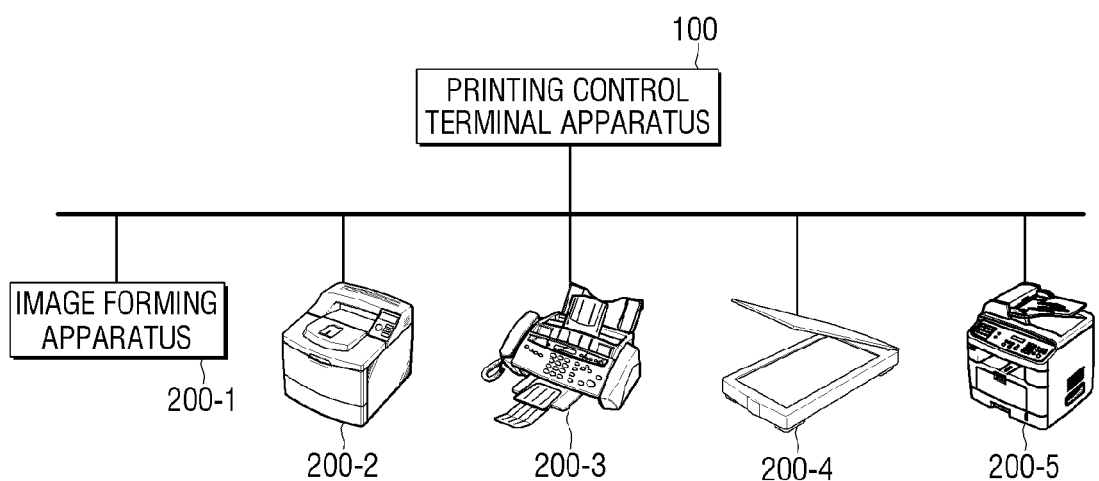
FIG. 1 is a view illustrating an image forming system according to an embodiment of the present disclosure.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. For reference, in explaining the present disclosure, detailed descriptions of related functions or configurations known in the art may be omitted to avoid obscuring the subject matter of the present disclosure. Terminologies to be described later are defined in consideration of their functions in the present disclosure, and may differ depending on user's or operator's intentions or customs. Accordingly, they should be defined based on the contents of the overall description and claims.

FIG. 1 is a view illustrating an image forming system according to an embodiment of the present general inventive concept.

Referring to FIG. 1, the image forming system may include a printing control terminal apparatus 100 and an image forming apparatus 200 (200-1 to 200-5). The printing control terminal apparatus 100 is connectable to one or more image forming apparatuses 200 (200-1 to 200-5). The printing control terminal device 100 transmits print data to the image forming apparatus 200-1, for example, and receives job log data from the image forming apparatus 200-1 that has completed a print job.

The printing control terminal apparatus 100 can perform data communication with the image forming apparatus 200-1 in wired and wireless communication methods. A solution program may be installed in the printing control terminal apparatus 100. Such a solution program may collect information on the print job, apparatus status information, and communication network status information from the image forming apparatus 200-1, generate a report based on the collected information, and provide an application that can generally mange the image forming apparatuses 200-1 to 200-5. That is, the printing control terminal apparatus 100 may perform connection between the image forming apparatus 200 and a network by centralized server solution software (hereinafter referred to as "solution program") that manages the image forming apparatuses 200-1 to 200-5, and may construct an image forming system environment in which job results can be collected/used through a pre-defined method. The solution program may be stored as computer-readable codes in a storage device and executed according to a control of a controller or a printing control terminal apparatus and/or an image forming apparatus of an image forming system.

The image forming apparatus 200 (200-1), for example, may be a printer, a fax machine, a scanner, or a multifunctional peripheral (MFP) having functions of a combination of the printer, the fax machine, and the scanner. The image forming apparatus 200-1 may perform at least one function of printing, copying, scanning, and faxing.

If the print job is successfully completed, the image forming apparatus 200-1 store the result of the job completed therein.

The jobs mean all types of tasks that can be processed in the image forming apparatus 200 such as a printer or an MFP. For example, the job may be classified into storing, printing, and sending data. Further, their combinations or applications may be included as job types.

That is, the printing control terminal apparatus 100 receives fax data (fax-in) through the fax machine 200-3, and stores the received fax data. Further, the printing control terminal apparatus 100 stores image data scanned through the scanner 200-4.

The printing control terminal apparatus 100 converts the received fax data and the scanned image data into print data. The printing control terminal apparatus 100 may create a document to be converted into print data. The converted print data is transmitted (fax-out) to the printer 200-2 or the MFP 200-5, for example.

The job types may include various job combinations, such as scan and print, scan and transmission, and reception and storage. Hereinafter, detail explanation will be made with respect to printing, copying, reception or fax reception (fax-in), transmission or fax transmission (fax-out), and scanning, which are frequently used in the image forming system. The present general inventive concept is not limited thereto. The job types may be different job from the above-describe jobs.

Hereinafter, it is assumed that the image forming apparatus 200-1 has successfully stored all job results without an error, and if the printing control terminal apparatus 100 is unable to properly bring the job result due to various reasons, a method of recognizing this and attempting at reconstruction or a method of notifying a user of this may be provided in the image forming system.

That is, data of a job accumulation amount in the image forming apparatus 200 has a small space capacity and is classified into important data. The job accumulation amount is not initialized until it is intentionally erased. By contrast, the job log data is accumulated through installation of an additional module only in a case in which the solution program of the printing control terminal apparatus 100 is used, and is not classified into important data. Since the job log data occupies a large capacity, it may be erased according to a design or user determination (preference).

Accordingly, count information between the job accumulation amount data and job quantity data of the image forming apparatus 200 may be different from each other. However, the image forming apparatus 200 according to the present disclosure performs processing to include the job accumulation amount data in the job log data so that inconsistency of the count information between the job accumulation amount data and the job quantity data can be prevented.

Further, the printing control terminal apparatus 100 may receive the job log data that includes both the job accumulation amount and the job quantity, and confirm whether the job log data has been lost to notify the user of the result of the confirmation.

Figure 2:
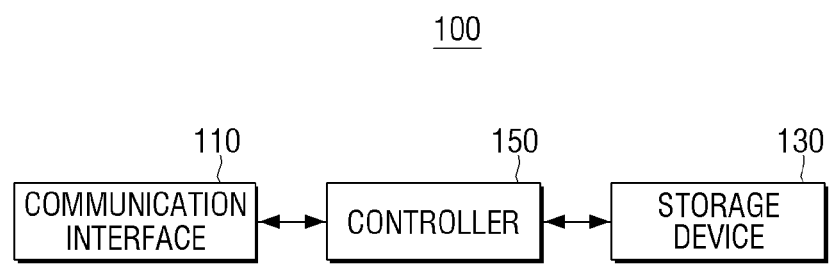
FIG. 2 is a block diagram illustrating a printing control terminal apparatus according to an embodiment of the present disclosure.

FIG. 2 is a block diagram illustrating the printing control terminal apparatus 100 of FIG. 1 according to an embodiment of the present disclosure.

Referring to FIG. 2, the printing control terminal apparatus 100 includes a communication interface 110, a storage device 130, and a controller 150.

The communication interface 110 may receive job log data from the image forming apparatus 200.

The job log data may include one or more job accumulation amounts with respect to one or more job types in a time order, or may include various log data including on or more job quantities with respect to one or more job types in the time order.

The performance of jobs in a time order through the image forming apparatus 200 will be schematically described with reference to FIG. 4.

Figure 4:
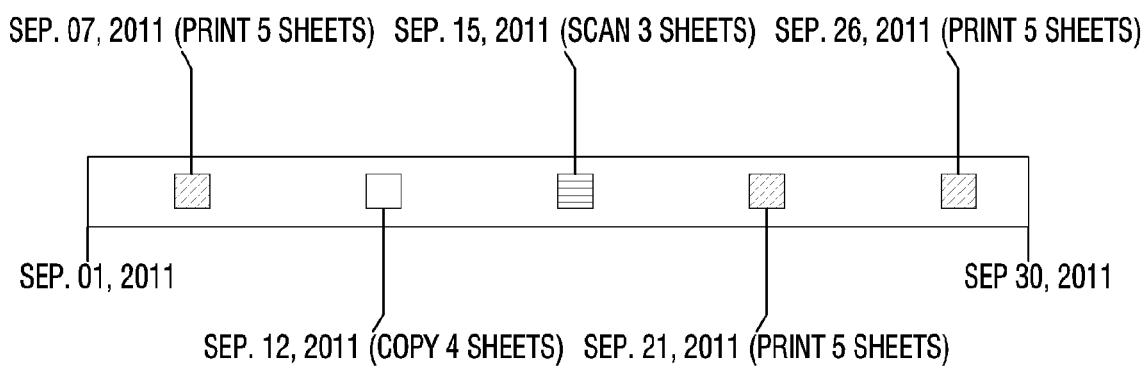
FIG. 4 is a diagram illustrating jobs performed in a time order by an image forming apparatus according to an embodiment of the present disclosure.

FIG. 4 is a diagram illustrating jobs performed in a time order by the image forming apparatus according to an embodiment of the present disclosure. Referring to FIG. 4, all jobs can be confirmed, which have been executed by the image forming apparatus 200 in a time period between Sep. 1, 2011 and Sep. 30, 2011 in the time order.

That is, the image forming apparatus 200 printed 5 sheets on Sep. 7, 2011, copied 4 sheets on Sep. 12, 2011, scanned 3 sheets on Sep. 15, 2011, printed 5 sheets on Sep. 21, 2011, and printed 5 sheets on Sep. 26, 2011.

In performing various jobs in the image forming apparatus 200 as described above, job log data is generated or updated whenever the corresponding job is completed. A method of generating job log data will be separately described hereinafter.

If 5 jobs illustrated in FIG. 4 are performed, 5 pieces of job log data in total are generated and stored. A method of storing job log data will be described hereinafter with reference to FIGS. 5 and 6.

Figure 5:
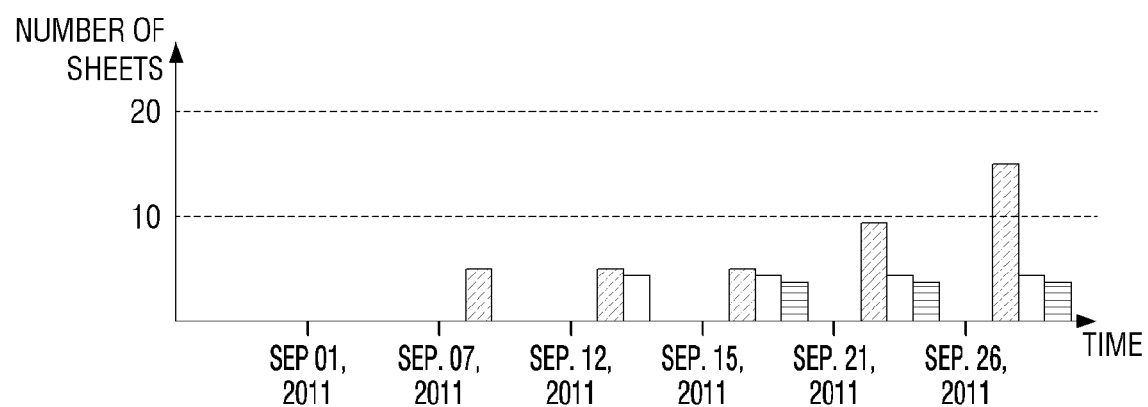
FIG. 5 is a diagram illustrating job accumulation amounts by job types in a time order in an image forming apparatus according to an embodiment of the present disclosure.

FIG. 5 is a diagram illustrating one or more job accumulation amounts with respect to one or more job types along a time order in an image forming apparatus according to an embodiment of the present disclosure. The job accumulation amounts with respect to one or more job types in a time order may be displayed on a display unit (not illustrated) in the image forming apparatus.

Referring to FIG. 5, 5 printed sheets are displayed as the accumulation amount on Sep. 7, 2011, and 5 printed sheets and 4 copied sheets are displayed as the accumulation amounts on Sep. 12, 2011. On Sep. 15, 2011, 5 printed sheets, 4 copied sheets, and 3 scanned sheets are displayed as the accumulation amounts. On Sep. 21, 2011, 10 printed sheets, 4 copied sheets, and 3 scanned sheets are displayed as the accumulation amounts. On Sep. 26, 2011, 15 printed sheets, 4 copied sheets, and 3 scanned sheets are displayed as the accumulation amounts.

That is, in a case of the job log data storing method as illustrated in FIG. 5, the accumulation amounts are stored with respect to job types (printing, copying, and scanning) in the time order. The job log data (hereinafter referred to as "first job log data") in which the accumulation amounts are stored with respect to job types in the time order can be expressed in various manners.

FIG. 6 is a diagram illustrating a data table including data of the job accumulation amounts illustrated in FIG. 5 with respect to job types in the time order.

Referring to FIG. 6, a first column represents a job end time (or job performing time), a second column represents a job type, and a third column represents an accumulation amount. Respective rows are aligned in a descending order depending on the job end times. The first job log data illustrated in FIG. 6 includes accumulation amounts with respect to job types. The job log data that includes information on job quantities in addition to the job accumulation amounts by job types will be described hereinafter.

FIG. 7 is a diagram illustrating a data table including job quantities according to job types in a time order in an image forming apparatus according to an embodiment of the present disclosure. The data table may be displayable on a display unit of the image forming apparatus.

In the data table of the job log data (hereinafter referred to as "second job log data") illustrated in FIG. 7, a horizontal axis represents various pieces of information, for example, a job end time, a job processing result, a job quantity, a job type, an identification number of an image forming apparatus, and a user ID, and a vertical axis represents values of corresponding items that are sequentially aligned depending on the job end time.

Specifically, a first column represents a job end time item, a second column represents a job processing result item, a third column represents a job quantity item, a fourth column represents a job type item, a fifth column represents an image forming apparatus identification number item, and a sixth column represents a user ID item.

The second job log data illustrated in FIG. 7 includes various pieces of information, such as the job processing result, the job quantity, the identification number of the image forming apparatus, and the user ID, in the time order. At this time, the size of the second job log data is larger than the size of the first job log data. Further, the first job log data and the second job log data have different storage positions.

FIG. 8 is a diagram illustrating a data table to be generated by adding the job accumulation amounts of the data table of FIG. 6 to the data table of FIG. 7.

The job log data (hereinafter referred to as "third job log data") illustrated in FIG. 8 is different from the second job log data in that the third job log data further includes a job accumulation amount. The generation of the second job log data as the third job log data using the first job log data according to an embodiment of the present disclosure will be described in more detail when the image forming apparatus 200 is described later.

Referring back to FIG. 2, the storage device 130 stores the third job log data that is received from the image forming apparatus 200.

The controller 150 aligns the third job log data in an ascending or descending order depending on the time order. The controller 150 extracts the job log data according to job types from the aligned job log data.

The controller 150 may extract the job accumulation amounts and the job quantities, which belong to a same job type, from the third job log data. At this time, the job type may be at least one of printing, copying, scanning, and faxing, or a combination of two or more of them. For example, the controller 150 may extract the job quantities and the job accumulation amount from the third job log data illustrated in FIG. 8 according to the time order of the print jobs that belong to the same job type. That is, the controller 150 may extract the print job quantity of 5 sheets and the job accumulation amount of 5 sheets on Sep. 7, 2011, the print job quantity of 5 sheets and the job accumulation amount of 10 sheets on Sep. 21, 2011, and the print job quantity of 5 sheets and the job accumulation amount of 15 sheets on Sep. 26, 2011. The controller 150 may also extract the job log data for the copy job or the job log data for the scan job.

The controller may determine whether the job log data has been lost using the extracted job quantity and the job accumulation amount.

The controller 150 confirms that the job log data for the print job on Sep. 7, 2011 and the job log data for the print job on Sep. 21, 2011 are temporarily consecutive job log data by comparing the job end times of the items of the third job log data.

The controller 150 extracts the print job accumulation amount of 5 sheets on Sep. 7, 2011 and the print job accumulation amount of 10 sheets on Sep. 21, 2011. The controller 150 calculates a difference value (5 sheets) by subtracting the job accumulation amount on Sep. 7, 2011 from the job accumulation amount on Sep. 21, 2011.

The controller 150 compares the print job quantity (5 sheets) on Sep. 21, 2011, which has been executed subsequently among the job log data for the print job on Sep. 7, 2011 and for the print job on Sep. 21, 2011, with the difference value. Since the job quantity (5 sheets) and the difference value (5 sheets) are equal to each other, the controller 150 determines that the job log data for the print jobs was not lost during a period between Sep. 7, 2011 and Sep. 21, 2011.

If the job quantity and the difference value are different from each other, the controller 150 determines that the job log data was lost during the period between Sep. 7, 2011 and Sep. 21, 2011.

Hereinafter, referring to FIG. 9, detection of whether the job log data has been lost will be described.

FIG. 9 is a diagram illustrating a data table to show that a portion of data in the data table illustrated in FIG. 8 has been lost.

Referring to FIG. 9, it can be confirmed that the job log data for the print job on Sep. 21, 2011 has been lost according to comparison between items of the job log data illustrated in FIG. 8.

If the printing control terminal apparatus 100 receives the job log data illustrated in FIG. 9 from the image forming apparatus 200, the controller 150 determines whether the job log data has been lost. Specifically, the controller 150 extracts the job log data for the print job. For example, the controller 150 extracts the job quantity (5 sheets) and the job accumulation amount (5 sheets) on Sep. 7, 2011 and the job quantity (5 sheets) and the job accumulation amount (15 sheets) on Sep. 26, 2011 with respect to the "print" job type.

The controller 150 calculates the difference value between the job accumulation amounts for two consecutive print jobs using the job end time information among the log data for the print job. For example, the controller 150 calculates the difference value of 10 sheets by subtracting the print job accumulation amount (5 sheets) on Sep. 7, 2011 from the print job accumulation amount (15 sheets) on Sep. 26, 2011.

The controller 150 compares the difference value (10 sheets) with the print job quantity (5 sheets) on Sep. 26, 2011. Since the difference value (10 sheets) and the job quantity (5 sheets) are different from each other according to a comparison result, the controller 150 can confirm that the print job log data was lost during the period between Sep. 7, 2011 and Sep. 26, 2011.

If it is determined that the job log data has been lost, the controller 150 may request lost data to the image forming apparatus 200 through the communication interface 110.

Thereafter, the controller 150 determines whether the lost data has been received from the image forming apparatus 200. If the lost data has been received, the controller 150 controls the storage device 130 to store the received lost data. If the lost data has not been received, the controller 150 stores information on whether the job log data has been lost in the storage device 130.

Figure 3:
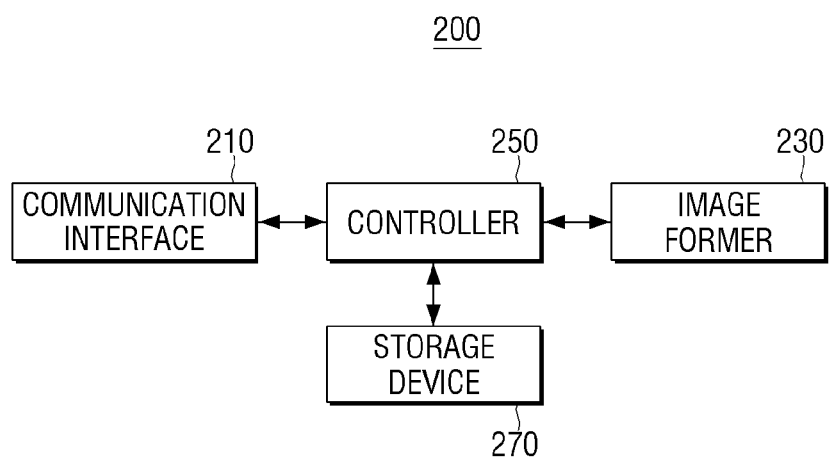
FIG. 3 is a block diagram illustrating an image forming apparatus according to an embodiment of the present disclosure.

FIG. 3 is a block diagram illustrating the image forming apparatus 200 of FIG. 1 according to an embodiment of the present disclosure.

Referring to FIG. 3, the image forming apparatus 200 according to an embodiment of the present disclosure includes a communication interface 210, an image former 230, a controller 250, and a storage device 270.

The communication interface 210 receives print data from the printing control terminal apparatus 100.

The image former 230 performs a print job using the received print data.

The controller 250 controls functions of the image forming apparatus 200, and generates first job log data and second job log data if the print job is completed.

The controller 250 extracts a job accumulation amount of the same type as the corresponding job from the pre-stored first job log data, adds the newly executed job quantity thereto to generate the job accumulation amount for the corresponding job, and generates the first job log data. After generating or updating the first job log data, the controller 250 generates the second job log data that includes a job end time, a job processing result, a job quantity, a job type, an image forming apparatus identification number, and a user ID, which are related to the corresponding job.

Next, the controller 250 extracts the job accumulation amount included in the first job log data, and generates third job log data by adding the extracted job accumulation amount to the second job log data. This will be described in more detail.

The first job log data illustrated in FIG. 6 includes job types and job accumulation amounts, which are aligned by job end times. The second job log data illustrated in FIG. 7 includes job processing results, job quantities, job types, identification numbers of image forming apparatuses, and user IDs, which are aligned by job end times.

The job performed on Sep. 7, 2011 in the first job log data and the job performed on Sep. 7, 2011 in the second job log data belong to the same "print" job type. The controller 250 includes the job accumulation amount to the second job log data by mapping the job accumulation amount extracted from the first job log data on the second job log data based on the job end times.

If all the jobs executed in the image forming apparatus 200 are completed, the controller 250 generates the first job log data. The controller 250 generates the second job log data within a preset time range after generating the first job log data. If synchronization is not made in a case in which the controller 250 generates the first job log data and then generates the second job log data, the first job log data and the second job log data may be inconsistent with each other.

The image forming apparatus 200 stores the first job log data in a storage space, such as a ROM, and stores the second job log data in a storage space, such as an HDD. The first job log data has a small data size, and thus it takes or requires a relatively short time in generating and storing the first job log data, whereas the second job log data has a large data size, and thus it takes or requires a relatively long time in generating and storing the second job log data.

Further, since a subject to store the first job log data in the ROM and a subject to store the second job log data in the HDD use different storage spaces, their control methods are different from each other. Further, if the first job log data or the second job log data is individually used, it is unable to detect whether the corresponding job log data has been lost.

Accordingly, only by using two different data generated from the same jobs, for example, the first job log data and the second job log data at the same time, the image forming system can detect one or more errors from the job log data. In a case in which the printing control terminal apparatus 100 intends to individually receive the first job log data and the second job log data and to check one or more errors of the job log data using the received data, data synchronization (data match) should be made between the first job log data and the second job log data. If the data synchronization is not made between the first job log data and the second job log data, it may be determined that the data has been lost although the job log data has not been lost actually in the image forming apparatus.

The image forming apparatus 200 according to the present disclosure can solve the problem that occurs due to non-synchronization between the first job log data and the second job log data by generating the third job log data through adding the job accumulation amount included in the first job log data to the second job log data and by transmitting only the generated third job log data to the printing control terminal apparatus 100.

Further, according to the present disclosure, since the image forming apparatus 200 generates the job log data of which the error can be corrected in a preset time period or according to a user's command and transmits the generated job log data to the printing control terminal apparatus 100, data communication resources can be effectively utilized.

Figure 10:
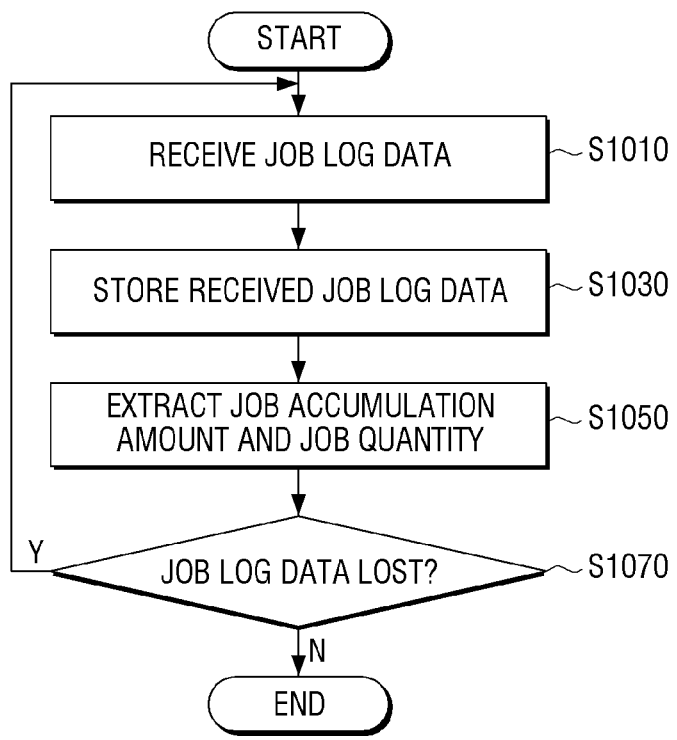
FIG. 10 is a flowchart illustrating a method of controlling a printing control terminal apparatus according to an embodiment of the present disclosure.

FIG. 10 is a flowchart illustrating a method of controlling the printing control terminal apparatus 100 of the image forming system of FIG. 1 according to an embodiment of the present disclosure.

Referring to FIG. 10, the printing control terminal apparatus 100 receives the job log data from the image forming apparatus 200 (S1010). That is, the printing control terminal apparatus 100 transmits a request message to the image forming apparatus 200, and accordingly receives the job log data stored in the image forming apparatus 200.

The printing control terminal apparatus 100 stores the received job log data (S1030). The printing control terminal apparatus 100 stores the job log data in a storage space, such as a HDD, a SSD, or a RAM. At this time, the job log data is job log data obtained by making the job accumulation amount of the first job log data included in the second job log data. The job log data is data that is aligned in a temporal order depending on the job end time.

The printing control terminal apparatus 100 extracts data on the job accumulation amounts and the job quantities by job types (S1050). That is, the printing control terminal apparatus 100 extracts the data on the job accumulation amounts and the job quantities included in the received job log data in the temporal order by job types, and generates the job log data for the print job. The job type may be at least one of printing, copying, scanning, and faxing, or a combination thereof.

More specifically, in the step S1050, the printing control terminal apparatus 100 analyzes the received job log data, and extracts the job accumulation amounts and the job quantities, which belong to the same job type, in the temporal order.

Next, the printing control terminal apparatus 100 determines whether the job log data has been lost based on the extracted job accumulation amount and the job quantity (S1070). Specifically, the printing control terminal apparatus 100 calculates the difference value between the successive job accumulation amounts of the extracted job accumulation amounts, and compares the job quantity of the job executed subsequently among the extracted job quantities with the difference value.

If the extracted job quantity is different from the difference value, the printing control terminal apparatus 100 determines that the job log data has been lost.

If the job log data has been lost, the printing control terminal apparatus 200 requests the lost data from the image forming apparatus 200.

Thereafter, the printing control terminal apparatus 100 determines whether the lost data has been received, and if the lost data has been received, the printing control terminal apparatus 100 stores the received lost data.

If the lost data has not been received, the printing control terminal apparatus 100 stores the information on whether the data has been lost.

Figure 11:
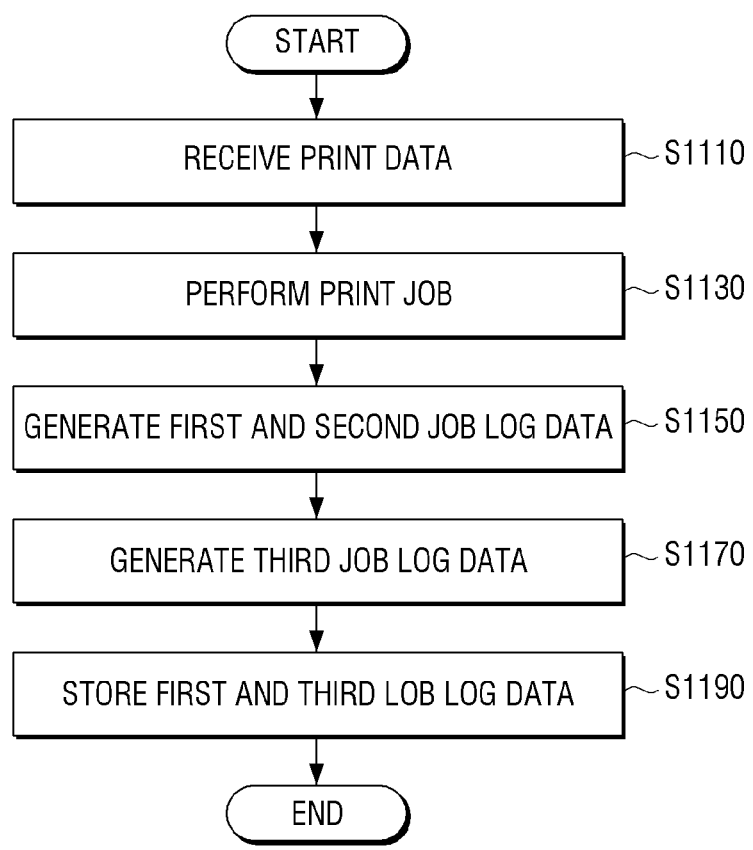
FIG. 11 is a flowchart illustrating a method of controlling an image forming apparatus according to an embodiment of the present disclosure.

FIG. 11 is a flowchart illustrating a method of controlling the image forming apparatus 200 of FIG. 1 according to an embodiment of the present disclosure.

Referring to FIG. 11, the image forming apparatus 200 receives the print data from the printing control terminal apparatus 100 (S1110). At this time, the print data is expressed by a page description language. At this time, the page description language is a language that explains the contents of a page to be printed with a higher level than an actual bitmap output. Examples of such page description language may be PDL (Page Description Language), PCL (Printer Command Language), SPL (Samsung Page Language), and the like.

The image forming apparatus 200 performs the print job using the received print data (S1130). That is, the image forming apparatus 200 performs printing using the received print data. For example, in the case where the image forming apparatus 200 is a color laser type printer, an image is printed through image forming processes of charging, writing, developing, transferring, and fusing. At this time, the charging means a process of forming (−) charge on a surface of a photosensitive conductor by corona discharge through applying of high voltage (about 7000 V) to a charger. The writing means a process of forming a latent image by extinguishing the (−) charge formed on the surface of the photosensitive conductor in a letter form through scanning of laser beams on the surface of the photosensitive conductor. The developing means a process of making toner particles having (−) component stick to the latent image portion of the surface of the photosensitive conductor. The transferring means a process of attracting the (−) toner particles formed on the drum surface in a print sheet direction by forming (+) charge on the rear surface of the sheet through applying of a predetermined transfer voltage to a transfer machine when the sheet passes between the photosensitive conductor and the transfer machine. Next, the fusing means a process of completely fusing the toner formed on the sheet by applying pressure to the sheet with appropriate heat. Through the above-described processes, an image is formed on the sheet. The image forming apparatus 200 may be one of various devices, such as an ink jet printer, a scanner, a copy machine, a facsimile machine, and the like, in addition to a laser printer. Even though the print job for the scanning, copying, and faxing is not explained in detail, there is not any problem in understanding the present disclosure, and thus additional explanation thereof will be omitted.

If the print job is completed, the image forming apparatus 200 generates the first job log data and the second job log data (S1150).

In this case, the first job log data is data that includes a job type, a job end time, and a job accumulation amount. The second job log data is data that includes a job end time, a job processing result, a job quantity, a job type, an identification number of an image forming apparatus, and a user ID.

If the print job by the print data is ended, the image forming apparatus 200 generates the job log data for the corresponding print job.

The image forming apparatus 200 generates the third job log data by making the job accumulation amount included in the first job log data included in the second job log data (S1170).

The image forming apparatus 200 stores the first job log data and the third job log data (S1190). That is, the first job log data that has a small data size may be stored in a ROM, and the second job log data that has a large data size may be stored in a HDD.

Figure 12:
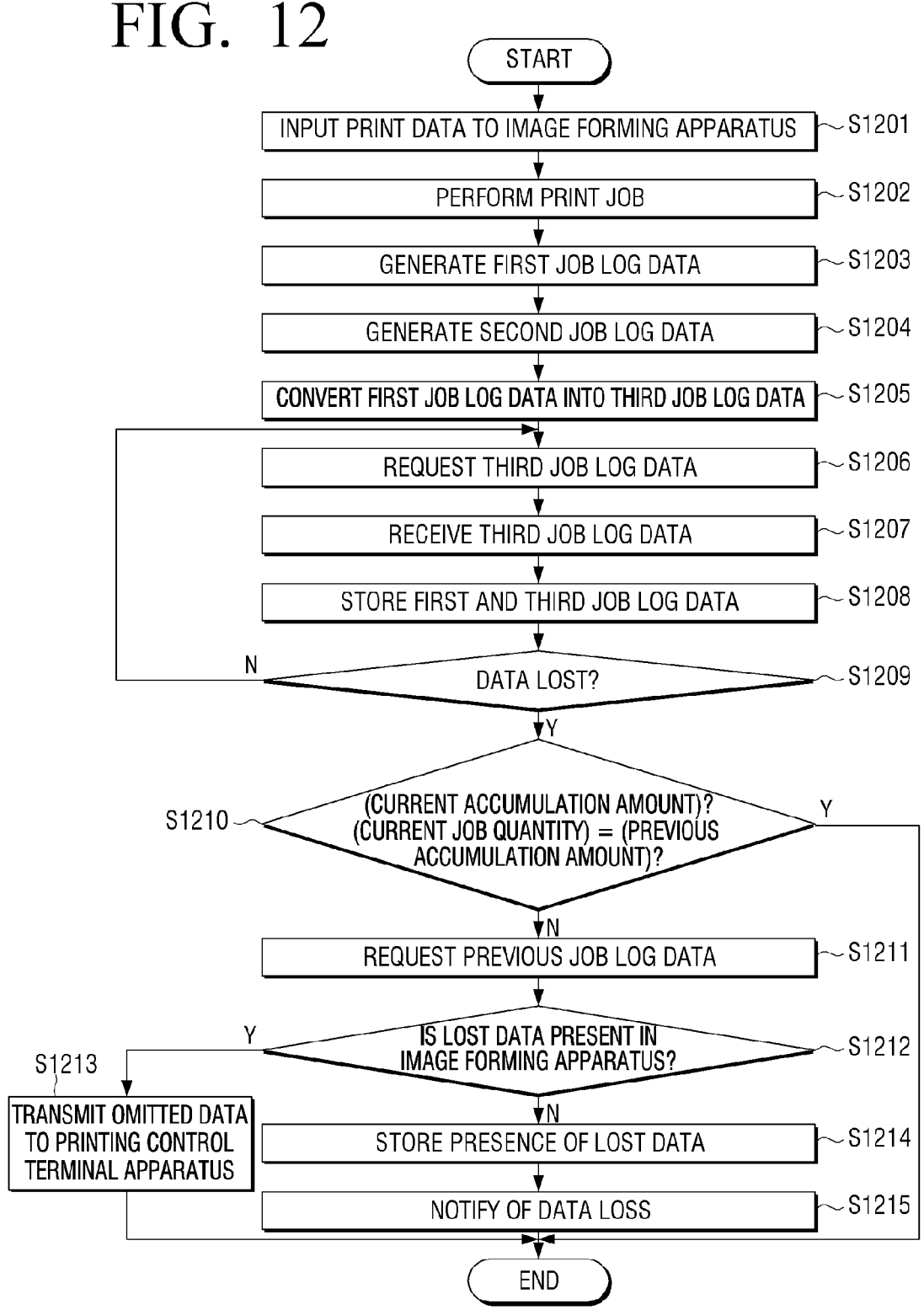
FIG. 12 is a flowchart illustrating a control method of an image forming system including an image forming apparatus and a printing control terminal apparatus according to an embodiment of the present disclosure.

FIG. 12 is a flowchart illustrating a control method of an image forming system including an image forming apparatus and a printing control terminal apparatus according to an embodiment of the present disclosure.

Referring to FIG. 12, the method of generating job log data and detecting errors will be described hereinafter.

The printing control terminal apparatus 100 generates the print data and transmits the generated print data to the image forming apparatus 200 in a wired or wireless communication method at operation S1201. The image forming apparatus 200 performs the print job using the received print data at operation S1202. If the print job is completed, the image forming apparatus 200 generates the first job log data for the corresponding job at operation S1203. Since the first job log data includes the accumulation amount for the corresponding job, the first job log data has a small data size, and after being stored, it is not erased in non-exceptional cases.

Thereafter, the image forming apparatus 200 generates the second job log data at operation S1204. The second job log data is a data that includes a job type, a job processing result, a job quantity, an identification number of an image forming apparatus, and a user ID. Since the second job log data has a large data size, it may be deleted or erased even after being stored.

The image forming apparatus 200 generates the third job log data by adding the job accumulation amount included in the first job log data to the second job log data in synchronization with the job end time at operation S1205. At this time, the third job log data is different from the second job log data on the point that the third job log data further includes the job accumulation amount in comparison to the second job log data.

The image forming apparatus 200 stores the first job log data and the third job log data.

The printing control terminal apparatus 100 requests the third job log data pre-generated or stored from the image forming apparatus 200 at operation S1206. The printing control terminal apparatus 100 receives the third job log data from the image forming apparatus 200 at operation S1207. At this time, the printing control terminal apparatus 100 may also receive the first job log data from the image forming apparatus 200. The printing control terminal apparatus 100 stores the first and third job log data at operation S1208, and determines whether the job log data has been lost at operation S1209. At this time, the printing control terminal apparatus 100 may determine whether the job log data has been lost in a predetermined period or when a user inputs a command to determine whether the data has been lost.

If it is determined that the job log data has been lost at operation S1209-Y, the printing control terminal apparatus 100 determines whether the job log data has been lost at operation S1210. That is, the printing control terminal apparatus 100 compares the difference value that is obtained by subtracting the current job quantity from the current job accumulation amount with the previous accumulation amount, and if the difference value is equal to the previous accumulation amount, the printing control terminal apparatus 100 determines that the job log data has not been lost at operation S1210-Y, and terminates the control method.

By contrast, if the difference value is different from the previous accumulation amount, the printing control terminal apparatus 100 determines that the job log data has been lost at operation S1210-N, and requests the previous job log data at operation S1211. That is, the printing control terminal apparatus 100 notifies the image forming apparatus 200 whether the previous job log data has been lost, and requests the lost data.

The image forming apparatus 200 determines whether the lost data has been stored at operation S1212, and if the lost data is present in the image forming apparatus 200 at operation S1212-Y, the image forming apparatus 200 transmits the lost data to the printing control terminal apparatus 100 at operation S1213.

If the lost data is not present in the image forming apparatus 200 at operation S1212-N, the image forming apparatus 200 stores information to notify of the presence of the lost data at operation S1214.

The printing control terminal apparatus 100 generates and displays a notification message for notifying of the data loss at operation S1215.

Hereinafter, a method for notifying of error detection of job log data that is supported by a solution program driven by the printing control terminal apparatus 100 will be described in detail.

Figure 13:
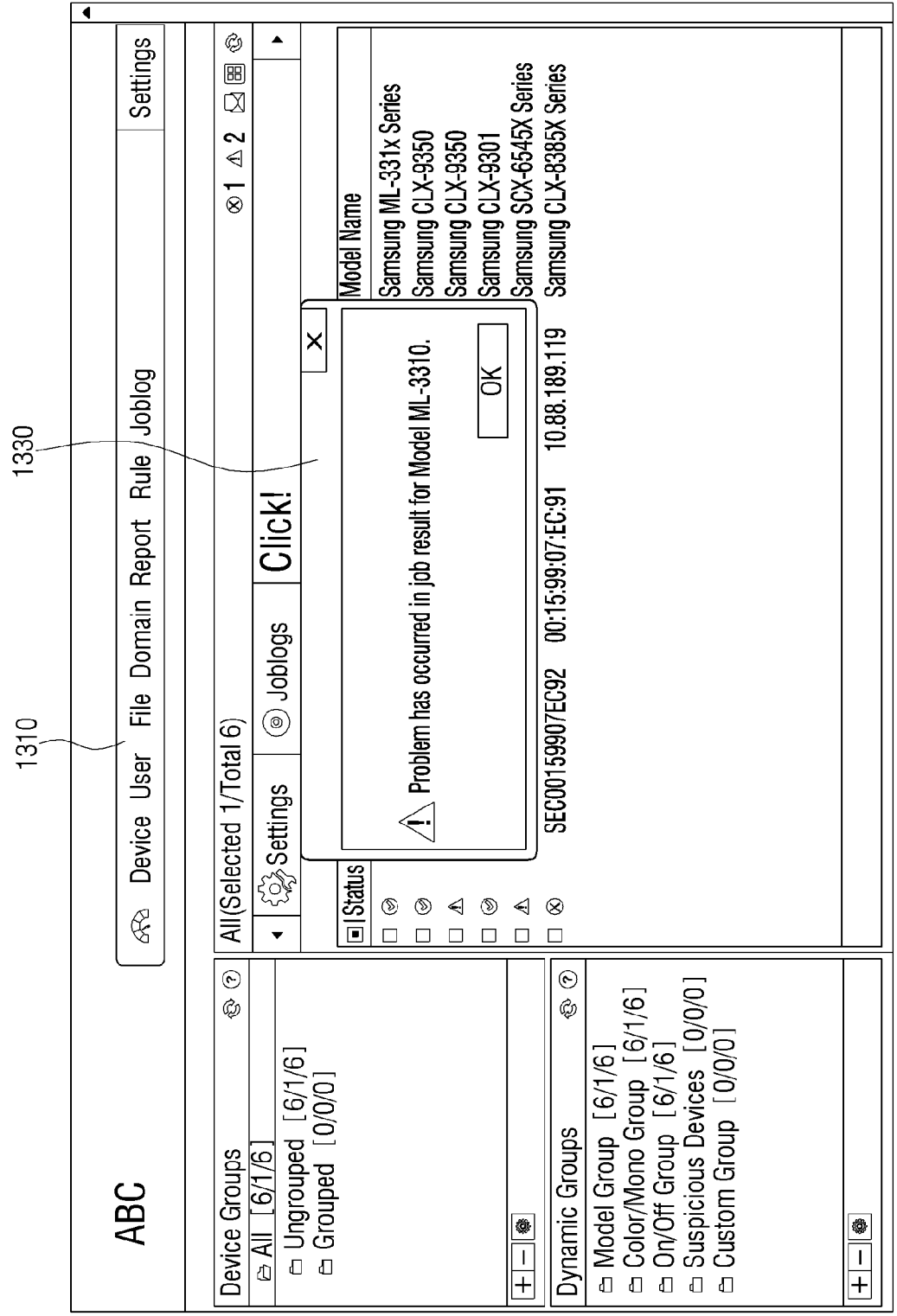
FIG. 13 is a diagram illustrating an exemplary screen of a guide window to display a guide message that notifies of whether job log data has been lost according to an embodiment of the present disclosure.

FIG. 13 is a diagram illustrating a guide window including an exemplary screen 1310 to display a guide message 1330 to notify whether job log data has been lost according to an embodiment of the present disclosure.

Referring to FIG. 13, a controller may generate a user interface (not illustrated) to be displayed on a display element thereof as the guide window using a solution program. The user interface includes the exemplary display screen 1310 of a solution program that is driven by a printing control terminal apparatus according to an embodiment of the present disclosure and the notification message 1330 that notifies of problems in the job result. The notification message 1330 may be displayed on the screen in a popup form.

Figure 14:
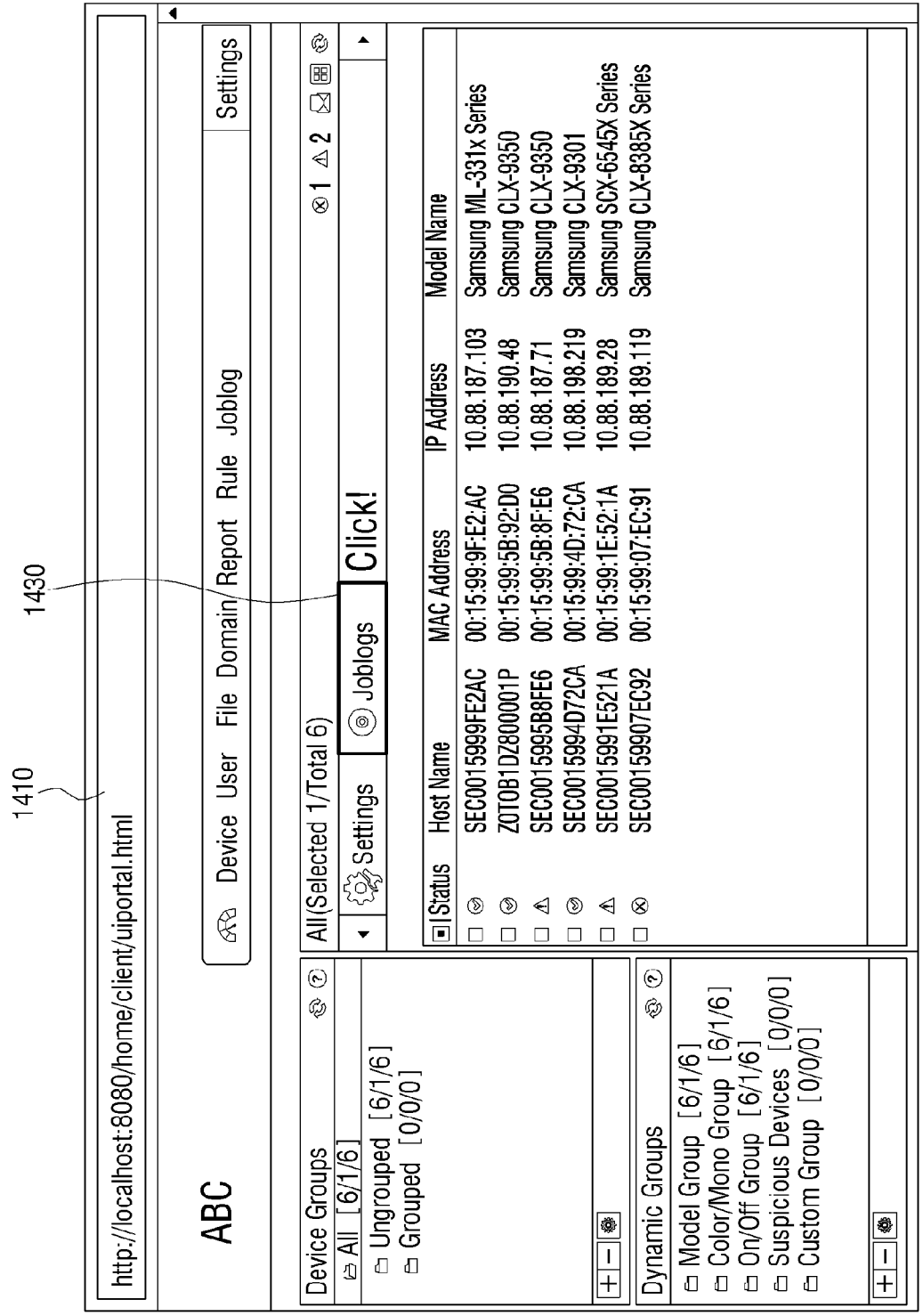
FIG. 14 is a diagram illustrating an exemplary screen of a display window to display detailed contents of job log data according to an embodiment of the present disclosure.

FIG. 14 is a diagram illustrating a display window including an exemplary screen 1410 to display detailed contents of job log data according to an embodiment of the present disclosure.

If a preset time elapses after the notification message 1330 is displayed as illustrated in FIG. 13, a screen that indicates status information on the job log data may be automatically displayed. If "Joblogs" item 1430 that is included in the display window displayed as illustrated in FIG. 13 is clicked, a list of image forming apparatuses 200 that are managed by the solution program is displayed.

Further, as illustrated in FIG. 14, various pieces of information, such as a state, a host name, a MAC address, an IP address, and a model name of each image forming apparatus 200, may be displayed, and status information of the corresponding image forming apparatus 200 may be displayed at the same time. If the user selects a specified image forming apparatus 200, the job log data of the selected image forming apparatus 200 can be confirmed in detail. This will be described hereinafter.

Figure 15:
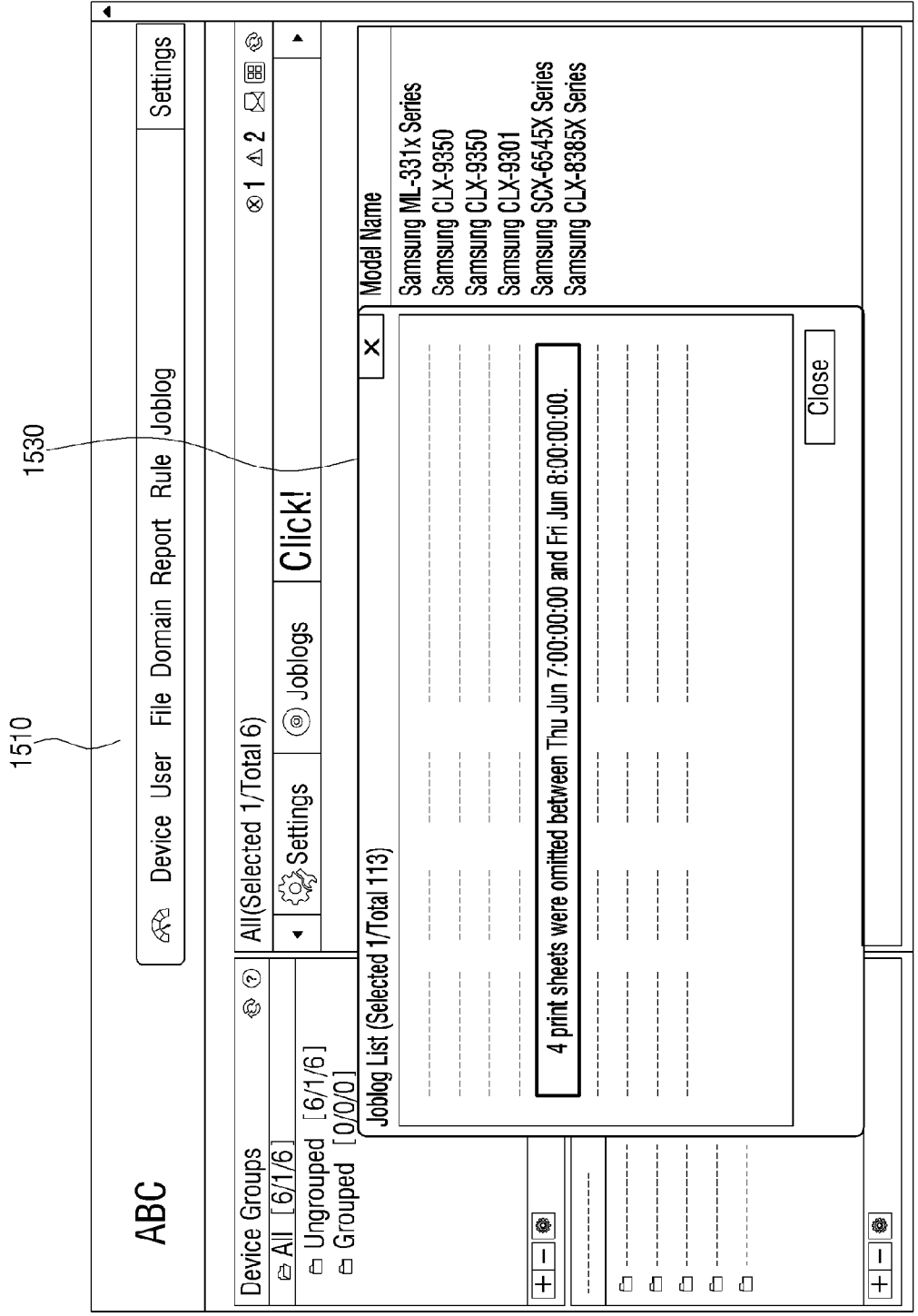
FIG. 15 is a diagram illustrating an exemplary screen of a display window to display detail information on whether job log data has been lost according to an embodiment of the present disclosure.

FIG. 15 is a diagram illustrating a display window including an exemplary screen 1510 to display detail information on whether job log data has been lost according to an embodiment of the present disclosure.

Referring to FIG. 15, in a state where the display window 1510 of the solution program is displayed, a job log list window 1530 may be displayed to overlap the display window 1510. That is, in the job log list, information, such as a job type, a job name, a quantity, a user ID, a job state, a job start time, and a job end time, may be displayed.

As illustrated in FIG. 15, a guide message "4 print sheets were omitted between June 7: 00:00 and June 8: 00:00." may be displayed on the job log list window 1530 with emphasis thereon compared with other portion of the window. A user and/or a manager (administrator) of the image forming apparatus 200 can easily notice whether the job log data of the image forming apparatus 200 has been lost by confirming such a guide message. Since errors of the job log data can be easily detected, the job log data omission time and the omitted job quantity can be easily detected or noticed.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing control terminal apparatus connectable to an image forming apparatus, comprising:
   a communication interface to receive job log data from the image forming apparatus;
   a storage device to store the received job log data which includes job quantity data of a job, job accumulation amount data accumulated from the job quantity of the job, and job accumulation data of a previous job which belongs to a same job type as the job; and
   a controller to extract one or more job accumulation amounts and one or more job quantities, which belong to a same job type, from the job log data in a time order, and to determine whether the job log data has been lost based on the extracted job accumulation amounts and job quantities.

2. The printing control terminal apparatus of claim 1, wherein the controller calculates a difference value between the job accumulation amounts of job log data having the same job type consecutively, and determines that the job log data has been lost when the job quantity of a job executed subsequently among the extracted job quantities is different from the difference value.

3. The printing control terminal apparatus of claim 1, wherein the job type is at least one of printing, copying, scanning, and faxing or a combination thereof.

4. The printing control terminal apparatus of claim 1, wherein the job log data comprises the job accumulation amounts and the job quantities which are aligned in the time order.

5. The printing control terminal apparatus of claim 4, wherein:
   the job log data further comprises an identification number of the image forming apparatus, a job end time, a job processing result, and a user ID of the image forming apparatus; and
   the job log data is aligned in at least one of ascending and descending orders depending on the job end time.

6. The printing control terminal apparatus of claim 1, wherein the controller requests lost data from the image forming apparatus through the communication interface if the job log data has been lost.

7. The printing control terminal apparatus of claim 6, wherein:
   the controller determines whether the lost data has been received; and
   when the lost data has been received, the controller stores the received lost data in the storage device, while if the lost data has not been received, the controller stores information on whether the data has been lost in the storage device.

8. An image forming apparatus comprising:
   a communication interface to receive print data;
   an image former to perform a print job using the received print data;
   a controller to generate first job log data and second job log data when the print job is completed, and to generate third job log data by correcting the second job log data using the first job log data; and
   a storage device to store the first job log data and the third job log data.

9. The image forming apparatus of claim 8, wherein:
   the third job log data further comprises job accumulation amounts included in the first job log data in addition to the second job log data; and
   the job accumulation amounts are aligned by job types according to a job time, and are included in the second job log data.

10. The image forming apparatus of claim 9, wherein the job type is at least one of printing, copying, scanning, and faxing or a combination thereof.

11. The image forming apparatus of claim 8, wherein the third job log data comprises job accumulation amounts and job quantities which are aligned in at least one of ascending and descending orders according to a job time order.

12. The image forming apparatus of claim 11, wherein the third job log data further comprises a job processing result, a user ID, and a serial number of the image forming apparatus.

13. A method of controlling a printing control terminal apparatus connectable to an image forming apparatus, the method comprising:
   receiving job log data from the image forming apparatus;
   storing the received job log data which includes job quantity data of a job, job accumulation amount data accumulated from the job quantity of the job, and job accumulation data of a previous job which belongs to a same job type as the job;
   extracting job accumulation amounts and job quantities, which belong to the same job type, from the job log data in a time order; and determining whether the job log data has been lost based on the extracted job accumulation amounts and job quantities.

14. The method of claim 13, wherein the determining comprises:
calculating a difference value between the job accumulation amounts of job log data having the same job type consecutively;
comparing the job quantity of a job executed subsequently among the extracted job quantities with the difference value; and
determining that the job log data has been lost if the extracted job quantity is different from the difference value.

15. The method of claim 13, wherein the job type is at least one of printing, copying, scanning, and faxing or a combination thereof.

16. The method of claim 13, wherein the job log data comprises the job accumulation amounts and the job quantities which are aligned in the time order.

17. The method of claim 16, wherein:
the job log data further comprises an identification number of the image forming apparatus, a job end time, a job processing result, and a user ID of the image forming apparatus; and
the job log data is aligned in at least one of ascending and descending orders depending on the job end time.

18. The method of claim 13, further comprising:
requesting lost data from the image forming apparatus if the job log data has been lost.

19. The method of claim 18, further comprising:
determining whether the lost data has been received; and
when the lost data has been received, storing the received lost data, while if the lost data has not been received, storing information on whether the data has been lost.

20. A non-transitory computer-readable recording medium to contain computer-readable codes as a program to execute the method of claim 13.

21. A method of controlling an image forming apparatus, comprising:
receiving print data;
performing a print job using the received print data;
generating first job log data and second job log data if the print job is completed;
generating third job log data by correcting the second job log data using the first job log data; and
storing the first job log data and the third job log data.

22. The method of claim 21, wherein:
the third job log data further comprises job accumulation amounts included in the first job log data in addition to the second job log data; and
the job accumulation amounts are aligned by job types according to a job time, and are included in the second job log data.

23. The method of claim 21, wherein the job type is at least one of printing, copying, scanning, and faxing or a combination thereof.

24. The method of claim 21, wherein the third job log data comprises job accumulation amounts and job quantities which are aligned in at least one of ascending and descending orders according to a job time order.

25. The method of claim 24, wherein the third job log data further comprises a job processing result, a user ID, and a serial number of the image forming apparatus.

* * * * *